United States Patent [19]

Manglos

[11] Patent Number: 4,837,442
[45] Date of Patent: Jun. 6, 1989

[54] NEUTRON RANGE SPECTROMETER

[75] Inventor: Stephen H. Manglos, East Syracuse, N.Y.

[73] Assignee: The United States of America as represented by the United States Department of Energy, Washington, D.C.

[21] Appl. No.: 166,581

[22] Filed: Mar. 10, 1988

[51] Int. Cl.$^4$ .............................................. G01T 3/00
[52] U.S. Cl. .............................. 250/390.01; 250/391
[58] Field of Search ........... 250/390 R, 390 F, 390 G, 250/390 H, 391

[56] References Cited

U.S. PATENT DOCUMENTS

| | | | |
|---|---|---|---|
| 3,524,061 | 8/1970 | Mizuho | 250/390 F |
| 3,878,373 | 4/1975 | Blum | 235/151.3 |
| 4,092,542 | 5/1978 | De Volpi | 250/392 |
| 4,134,016 | 1/1979 | Larsen | 250/392 |
| 4,180,736 | 12/1979 | Goodman | 250/363 |
| 4,282,435 | 8/1981 | Stern | 250/390 |
| 4,291,227 | 9/1981 | Caldwell et al. | 250/328 |

OTHER PUBLICATIONS

Berliner, R., King, J., & Mildner, D., "An Inexpensive Method for Testing Position Sensitive Particle Detectors", *Nuclear Instruments and Methods*, vol. 152, 1978, pp. 431–435.

*Primary Examiner*—Janice A. Howell
*Attorney, Agent, or Firm*—Anne D. Daniel; James H. Chafin; William R. Moser

[57] ABSTRACT

A neutron range spectrometer and method for determining the neutron energy spectrum of a neutron emitting source are disclosed. Neutrons from the source are collimnated along a collimation axis and a position sensitive neutron counter is disposed in the path of the collimated neutron beam. The counter determines positions along the collimation axis of interactions between the neutrons in the neutron beam and a neutron-absorbing material in the counter. From the interaction positions, a computer analyzes the data and determines the neutron energy spectrum of the neutron beam. The counter is preferably shielded and a suitable neutron-absorbing material is He-3. The computer solves the following equation in the analysis:

$$N(x)\Delta x = \sum_{i=1}^{n} A_i(E)_i \Delta E_i [e^{-Cx} - e^{-C(x+\Delta x)}]$$

where:

$N(x)\Delta x$ = the number of neutron interactions measured between a position x and $x+\Delta x$, $A_i(E_i)\Delta E_i$ = the number of incident neutrons with energy between $E_i$ and $E_i + \Delta E_i$, and $C = C(E_i) = N\sigma(E_i)$ where N = the number density of absorbing atoms in the position sensitive counter means and $\sigma(E_i)$ = the average cross section of the absorbing interaction between $E_i$ and $E_i + \Delta E_i$.

8 Claims, 1 Drawing Sheet

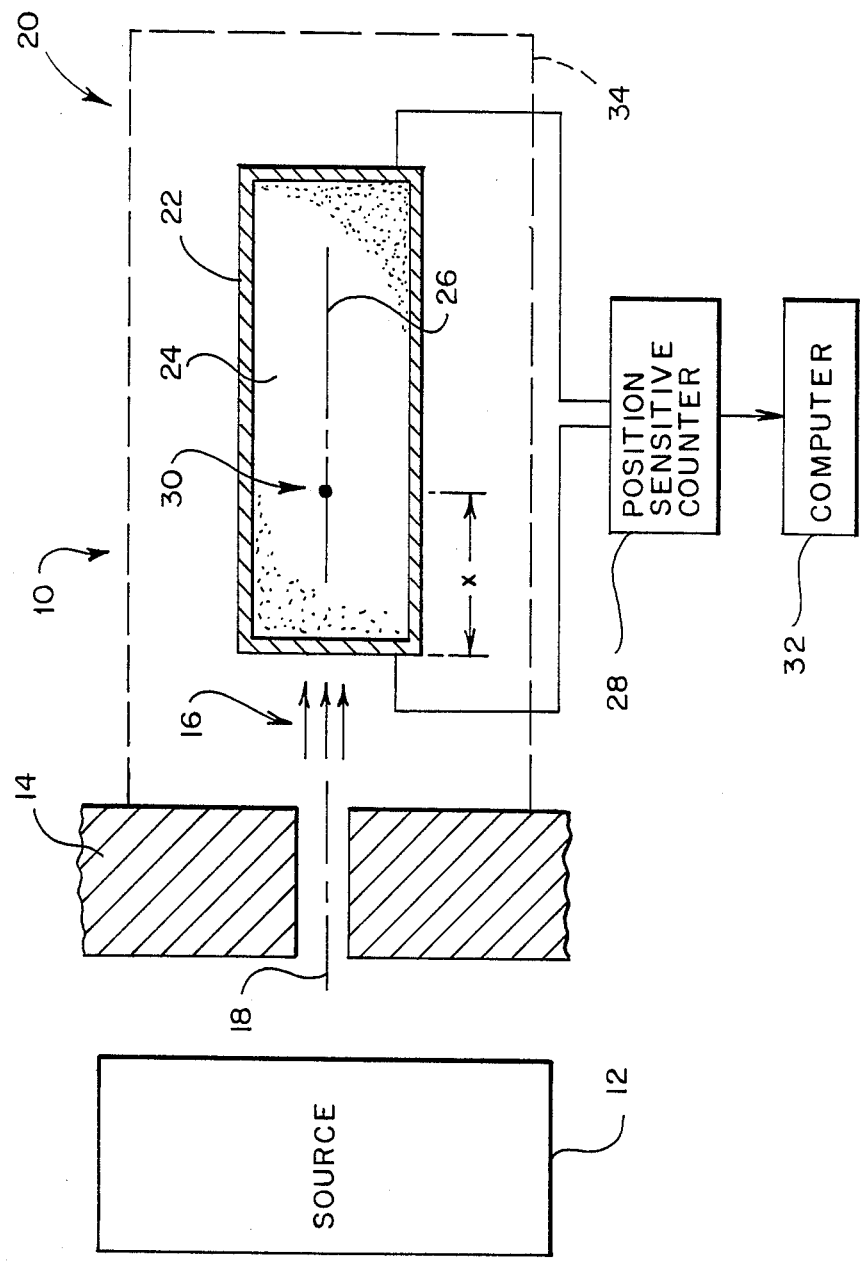

NEUTRON RANGE SPECTROMETER

The United States Government has rights in this invention pursuant to Contract No. DE-AC04-76DP03533 between the U.S. Department of Energy and Rockwell International Corporation.

FIELD OF THE INVENTION

The present invention relates generally to a neutron range spectrometer, and more particularly to a neutron range spectrometer for measuring the energy spectrum of a beam of neutron for energies below about 500 KeV to thermal.

BACKGROUND OF THE INVENTION

One prior system for measuring the neutron spectrum of a beam of neutrons is the use of activation foils. Unfortunately, activation foils can only measure neutron flux at specific, discrete energies. Therefore, in order to obtain an energy spectrum, numerous foils are necessary. In addition, there is no "real-time" output of spectral information where such activation foils are used.

Another method of determining the energy spectrum of a beam of neutrons is time-of-flight measurements. Systems of this type require sophisticated and expensive equipment, and must use a pulsed neutron source and time-of-flight electronics. Such systems are not usable with passive sources emitting a time-continuous source of neutrons.

Disclosed in U.S. Pat. No. 4,180,736 (Goodman) is a time-of-flight measuring system for detecting neutron energies. The system includes a scintillator positioned at a desired angle with respect to the incoming neutron beam such that the sum of the transit times of neutrons and photons in the scintillator is substantially independent of the position of the scintillation points within the scintillator. Unfortunately, this system must use pulsed neutrons and is not able to determine the neutron energy of slow (less than 10 KeV) neutrons.

In U.S. Pat. No. 4,291,227 (Caldwell et al), a non-destructive method for distinguishing among and quantifying the mass of individual fuel plates in fuel drawers is disclosed. The method includes a neutron counter coupled to a gamma-ray spectrometer. The data is analyzed by a computer.

SUMMARY OF THE INVENTION

In accordance with the present invention, a neutron range spectrometer and method for determining the neutron energy spectrum of a neutron emitting source are provided. A neutron collimator is provided which produces a collimated neutron beam from the source along a collimation axis. A position sensitive neutron counter means is disposed in a path of the collimated neutron beam in order to determine the positions along the collimator axis of interactions between the neutrons in the neutron beam and the counter means. The interaction positions determined are then analyzed by a suitable analyzing means in order to determine the neutron energy spectrum of the neutron beam.

In a preferred embodiment of the present invention, the position sensitive counter means includes a container having a longitudinal axis which is parallel to the collimation axis and a strongly neutron-absorbing material provided in the container. Preferably, the neutron-absorbing material is He-3. A neutron shield is also preferably provided around the container.

In analyzing the interaction positions determined, the following equation is preferably solved:

$$N(x)\Delta x = \sum_{i=1}^{n} A_i(E)_i \Delta E_i [e^{-Cx} - e^{-C(x+\Delta x)}]$$

where:

$N(x)\Delta x$ = the number of neutron interactions measured between a position x and $x + \Delta x$, $A_i(\Delta E_i)$ = the number of incident neutrons with energy between $E_i$ and $E_i + \Delta E_i$, and $C = C(E_i) = N \sigma(E_i)$ where N = the number density of absorbing atoms in the position sensitive counter means and $\sigma(E_i)$ = the average cross section of the absorbing interaction between $E_i$ ad $E_i + \Delta E_i$.

It is an object of the present invention to determine the energy spectrum of a beam of neutrons for energies below about 500 KeV, and especially for energies below about 100 KeV to thermal.

It is also an object of the present invention to provide a relatively inexpensive, portable, and versatile spectrometer covering the entire range of energies with a single measurement.

It is a further object of the present invention to produce a complete neutron energy spectrum from only a single measurement.

Still another object of the present invention is to provide an apparatus and method for determining the neutron energy spectrum of a source in order to allow for a general non-destructive assay of the source, in particular for the presence and amount of various fissile materials and/or non-fissile materials in the source.

Other features and objects of the present invention are stated in or apparent from a detailed description of a presently preferred embodiment of the invention found hereinbelow.

BRIEF DESCRIPTION OF THE DRAWING

The single FIGURE is a schematic view in partial cross section of the neutron range spectrometer of the present invention.

DETAILED DESCRIPTION OF THE PREFERRED EMBODIMENT

With reference now to the drawing in which like numerals represent like elements, a neutron range spectrometer 10 is depicted in the figure. Neutron range spectrometer 10 is used to determine the energy spectrum of neutrons emitted by a passive source 12. Neutron range spectrometer 10 includes a collimator 14. Collimator 14 is used to produce a collimated beam 16 of neutrons from source 12 which travel along a collimation axis 18.

Neutron range spectrometer 10 also includes a position sensitive neutron counter means 20. Counter means 20 includes a container 22 in which a strongly neutron-absorbing material 24 is contained. Neutron-absorbing material 24 is required to have a neutron absorption cross section much larger than the neutron scattering cross section so that little scattering occurs. In addition, the absorption cross section of material 24 must change significantly as a function of energy. A suitable container and material appropriate for the present invention is a He-3 filled position-sensitive proportional counter such as that produced by Reuter-Stokes. It should be appreciated that container 22 and neutron-absorbing material 24 have a longitudinal axis 26. This longitudinal axis is oriented parallel to collimator axis 18 such that collimated beam 16 of neutrons is directed along the longitudinal axis of neutron-absorbing material 24 to provide the greatest interaction distance possible in container 22.

Counter means 20 also includes a suitable position sensitive counter 28. Position sensitive counter 28 is used to determine the position or distance "x" of an interaction 30 between a neutron and neutron-absorbing material 24. Position sensitive counter 28 includes suitable electronics to determine position "x" from the electrical signals produced by the interaction. Various versions of such electronics have been described in the literature, such as in *Nuclear Instrumentations and Methods*, R. Burliner, J. S. King, and D. F. R. Mildner, 152 (1978) 431.

A suitable analyzing means 32 in the form of a computer is then used to analyze the interaction positions determined and to determine thus the neutron energy spectrum of collimated beam 16.

Analyzing means 32 is designed to use mathematics to unfold the neutron spectrum from the measurements of interaction positions determined by position sensitive counter 28. The unfolding mathematics is based upon the following equation which describes the theory of neutron range spectrometer 10:

$$N(x)\Delta x = \sum_{i=1}^{n} A_i(E)_i \Delta E_i [e^{-Cx} - e^{-C(x+\Delta x)}]$$

where:
$N(x) \Delta x$ = the number of neutron interactions measured between a position x and $x+\Delta x$,
$A_i(E_i) \Delta E_i$ = the number of incident neutrons with energy between $E_i$ and $E_i + \Delta E_i$, and
$C = C(E_i) = N \sigma(E_i)$ where N = the number density of absorbing atoms in the position sensitive counter means and $\sigma(E_i)$ = the average cross section of the absorbing interaction between $E_i$ and $E_i + \Delta E_i$.

The summation is over the "n" energy groups which are desired to be unfolded. There is an equation of this type for each position (x to $x+\Delta x$) measured. It should be noted that there must be at least as many equations as unknowns to obtain a unique solution. Standard mathematical techniques can be used to estimate the final errors on the A(E).

There are two potential methods to unfold A(E) ΔE. The first is to invert the simultaneous equations, solving directly for A(E). This inversion is probably best accomplished using iterative techniques which can handle the noise characteristics of the measured data. The second involves using a neutron transport code (e.g. MORSE), inputting A(E) ΔE, and attempting to reproduce the measured N(x) Δx by integrating on the A(E) ΔE. Alternatively, since MORSE takes some time to run, this method could use a look-up of MORSE results calculated previously. The advantage of the first method is its mathematical simplicity. The advantage of the second method is that the small perturbations caused by neutron scattering can be accounted for directly. Of course, even in the first method, scattering effects can be accounted for in an approximate way.

Neutron range spectrometer 10 also preferably includes a shield 34 (depicted schematically) around container 22. In many environments, it is desirable to eliminate background radiation.

In use, neutron range spectrometer 10 gives a continuous neutron spectrum from a single measurement. The measured energy regions can be adjusted in a continuous manner for all energies below about 100 KeV.

Typically, neutron range spectrometer 10 is used as a general, non-destructive assay to determine efficiently and quickly the presence and amount of various fissile materials and non-fissile matreials in source 12. The neutrons produced by source 12 are collimated by collimator 14 into a collimated beam 16 travelling along collimated axis 18. Counter means 20 with longitudinal axis 26 of container 22 parallel and preferably coincident with collimator axis 18, determines the position of neutron interactions with neutron-absorbing material 24. Analyzing means 32 then determines the energy spectrum of collimated beam 16 using suitable unfolding mathematics as discussed above.

It should be appreciated that neutron range spectrometer 10 is easily constructed using already existing detectors and electronics to provide a relatively simple, and fairly portable spectrometer. The unfolding mathematics, particularly for the first method, are also relatively straight forward and easily accomplished.

Besides non-destructive assaying, it should also be appreciated that neutron range spectromter 10 is also suitably used in other applications including: health physics, particularly radiation shielding design and evaluation; basic nuclear physics; critical mass physics; and other areas of nuclear energy production.

While the present invention has been described with respect to an exemplary embodiment thereof, it will be understood by those of ordinary skill in the art that variations and modifications can be effected within the scope and spirit of the invention.

I claim:

1. A neutron range spectrometer for determining a neutron energy spectrum of a neutron emitting source comprising:
   a neutron collimator which produces a collimated neutron beam from the source along a collimation axis;
   a position sensitive neutron counter means disposed in the path of the collimated neutron beam for determining position along the collimator axis of interactions between neutrons in the neutron beam and said counter means; and
   an analyzing means for analyzing the interaction positions determined and for determining the neutron energy spectrum of the neutron beam.

2. A neutron range spectrometer as claimed in claim 1 wherein said position sensitive counter means includes a container having a longitudinal axis which is parallel to the collimation axis, and a strongly neutron-absorbing material in said container.

3. A neutron range spectrometer as claimed in claim 2 wherein said neutron-absorbing material is He-3.

4. A neutron range spectrometer as claimed in claim 2 and further including a neutron shield surrounding said container.

5. A neutron range spectrometer as claimed in claim 1 wherein said analysis means includes a means for solving the following equation:

$$N(x)\Delta x = \sum_{i=1}^{n} A_i(E)_i \Delta E_i [e^{-Cx} - e^{-C(x+\Delta x)}]$$

where
$N(x)\Delta x$ = the number of neutron interactions measured between a position x and $x+\Delta x$, $A_i(E_i) \Delta E_i$ = the number of incident neutrons with energy between $E_i$ and $E_i + \Delta E_i$, and $C = C(E_i) = N\sigma(E_i)$ where $N$ = the number density of absorbing atoms in the position sensitive counter means and $\sigma(E_i)$ = the average cross section of the absorbing interaction between $E_i$ and $E_i + \Delta E_i$.

6. A method for determining a neutron energy spectrum below about 500 Kev of a neutron emitting source comprising the steps of:

collimating neutrons produced by the source into a beam having a collimation axis;

disposing a strongly neutron-absorbing material having a longitudinal axis parallel to the collimation axis and in position to absorb neutrons in the beam along the longitudinal axis of the material;

determining the distance along the longitudinal axis of the material where neutrons in the beam are absorbed; and analyzing the distances determined to determine the neutron energy spectrum of the beam.

7. A method for determining a neutron energy spectrum as claimed in claim 6 and further including the step of shielding the strongly neutron-absorbing material.

8. A method for determining a neutron energy spectrum as claimed in claim 6 wherein said analyzing step includes the solving of the following equation:

$$N(x)\Delta x = \sum_{i=1}^{n} A_i(E)_i \Delta E_i [e^{-Cx} - e^{-C(x+\Delta x)}]$$

where:

$N(x)\Delta x$ = the number of neutron interactions measured between a position $x$ and $x + \Delta x$, $A_i(E_i)$ = the number of incident neutrons with energy between $E_i + \Delta E_i$, and $C = C(E_i) = N \sigma(E_i)$ where $N$ = the number density of absorbing atoms in the position sensitive counter means and $\sigma(E_i)$ = the average cross section of the absorbing interaction between $E_i$ ad $E_i + \Delta E_i$.

* * * * *